H. A. HERZBERG.
NUT LOCK.
APPLICATION FILED JAN. 31, 1914.

1,123,531. Patented Jan. 5, 1915.

Witnesses:
Frank Smith
C. W. Benjamin

Inventor
Harry A. Herzberg
By his Attorney Benedict & Wise

UNITED STATES PATENT OFFICE.

HARRY A. HERZBERG, OF NEW YORK, N. Y.

NUT-LOCK.

1,123,531.  Specification of Letters Patent.  Patented Jan. 5, 1915.

Application filed January 31, 1914. Serial No. 815,627.

*To all whom it may concern:*

Be it known that I, HARRY A. HERZBERG, a citizen of the United States, residing at 785 Lexington avenue, city, county, and State of New York, have invented a new and useful Improvement in Nut-Locks, of which the following is a specification.

The object of my invention is to make a device of this class which will positively lock a nut at any point that an operator may wish to secure the same. This object is accomplished by my invention, one embodiment of which is hereinafter set forth.

For a more particular description of my invention, reference is to be had to the accompanying drawings, forming a part hereof, in which—

Figure 2:
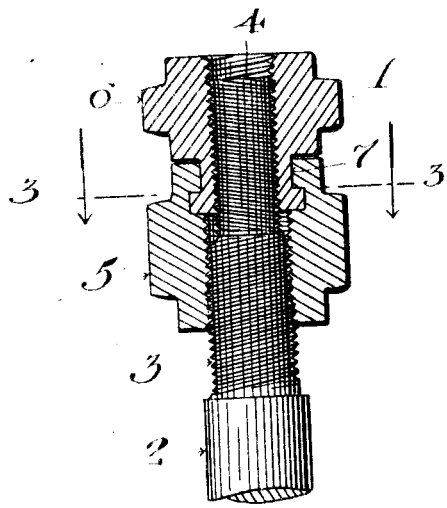
Figure 1:
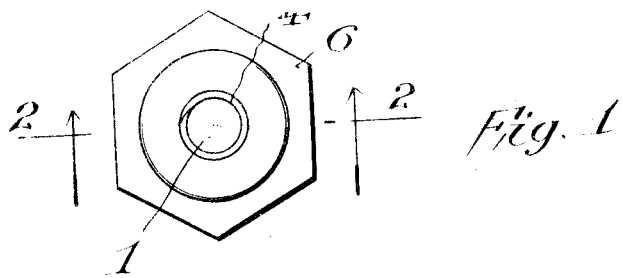
Figure 3:
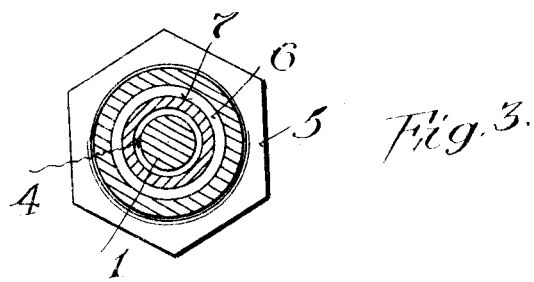

Figure 1 is a plan view of my improved nut luck on a bolt. Fig. 2 is a sectional view, taken on the line 2—2 of Fig. 1, looking in the direction of the arrows. Fig. 3 is a sectional view, taken on the line 3—3 of Fig. 2, looking in the direction of the arrows.

Throughout the various views of the drawings, similar reference characters designate similar parts.

My improved nut lock 1 may be applied to any suitable bolt 2 which has right and left threads 3 and 4 of the same pitch and different diameters so as to fit the larger and smaller parts of the nut, 5 and 6 respectively. These parts 5 and 6 are swiveled together so that one may turn on the other. This is accomplished in the following manner: The part 6 is first made and on the part designated 7, which is subsequently engaged by the outer portion of the nut 5, is carefully machined so as to be true. It is then coated by any protecting material which is suitable for the purpose and placed in the mold. The pattern for the part 5 is also placed in the mold at the same time and withdrawn, leaving a suitable cavity for the metal which is subsequently poured into the mold. The metal of the part 5 when so poured forms a suitable shoulder adjacent to the part 7 and interlocks with the same with a swivel joint but cannot fuse with the same because of the protecting coating above specified. After the part 5 has been properly cast, as above described, both parts 5 and 6 are removed from the mold and finished with suitable right and left threads so as to fit the parts 3 and 4 respectively, as shown. When the nut 1 is applied to the bolt 2, the part 5 is turned one way and the part 6 the other, and then the nut is advanced on to the bolt. By reversing the movement it is withdrawn from the bolt.

In the modification above described the pitch of the threads 3 and 4 is the same, so that the parts 5 and 6 are turned the same amount in opposite directions. By having the pitch of the thread 4 greater or less than the pitch of the thread 3, the parts 6 or 5 are turned less or more rapidly relatively to each other, as is obvious. In any event the nut 1 is applied to the bolt 2, or removed therefrom by turning the parts 5 and 6 simultaneously in opposite directions. If there is any play between these parts 5 and 6 it is not necessary to turn them simultaneously, but one may be turned a few degrees without moving the other, and then the other may be turned so that they may be turned alternately.

While I have shown and described some embodiments of my invention, it is obvious that it is not restricted thereto, but is broad enough to cover all structures that come within the scope of the annexed claims.

What I claim is:

1. A nut composed of two parts, one swiveled on the other so that the parts cannot be separated, one of said parts being provided with right threads and the other with left threads.

2. A bolt provided with right and left threads, a nut with two parts swiveled on each other so that the two parts cannot be separated under any circumstances, and right threads on one part of said nut and left threads on the other so that said nut may properly fit said bolt.

Dated: January 30th, 1914.

HARRY A. HERZBERG.

Witnesses:
 H. R. SQUIER,
 FRED DIEFFENBACH, Jr.